United States Patent [19]

Allen

[11] Patent Number: 6,011,610

[45] Date of Patent: Jan. 4, 2000

[54] COMPATIBLE DIGITAL SOUNDTRACKS FOR 70 MM MOTION PICTURE FILM

[75] Inventor: Ioan R. Allen, San Francisco, Calif.

[73] Assignee: Dolby Laboratories Licensing Corporation, San Francisco, Calif.

[21] Appl. No.: 09/098,388

[22] Filed: Jun. 16, 1998

[51] Int. Cl.[7] ............................ G03B 31/00; G03B 31/02
[52] U.S. Cl. .................................. 352/5; 352/11; 352/27; 352/37
[58] Field of Search .................................. 352/1, 11, 27, 352/37, 5, 26, 29, 30, 232, 233; 369/16, 17, 125, 97, 98; 360/3

[56] References Cited

U.S. PATENT DOCUMENTS

5,639,585  6/1997  Callahan ................................... 430/140
5,757,465  5/1998  Seagrave .................................... 352/11

Primary Examiner—Safet Metjahic
Assistant Examiner—Rodney Fuller
Attorney, Agent, or Firm—Gallagher & Lathrop; Thomas A. Gallagher

[57] ABSTRACT

Dolby Digital and Sony SDDS digital signal carrying optical symbols on large-format motion picture film (e.g., film having any of the various 70 mm formats) are recorded in such a way as to permit existing 35 mm optical readers and signal decoders to recover the soundtracks with little or no modification. The conventional motion picture soundtrack in the form of a two-dimensional array of photographically recorded symbols representing digital information intended for application to 35 mm motion picture film is modified by magnifying the symbols in the direction in which the motion picture film is transported when played, the degree of magnification being proportional to the ratio of the film speed of the large-format motion picture film to the 35 mm film speed. The modified soundtrack is applied to the large-format motion picture film, whereby when said large-format motion picture film is played the information recovered is essentially the same as the information recovered from 35 mm motion picture film to which the conventional motion picture soundtrack is applied.

5 Claims, 5 Drawing Sheets

FIG._7

COMPATIBLE DIGITAL SOUNDTRACKS FOR 70 MM MOTION PICTURE FILM

FIELD OF THE INVENTION

This invention relates to motion picture soundtracks. More particularly the invention relates to applying one or more motion picture soundtracks, in the form of a two-dimensional array of symbols representing digital information, to a large-format motion picture film (such as 70 mm film), having an increased film speed relative to 35 mm motion picture film, such that, when the large-format motion picture film is played, the information recovered is essentially the same as the information recovered from 35 mm motion picture film to which the normal format of said one or more motion picture soundtracks is applied.

INCORPORATION BY REFERENCE

Each of the following U.S. Pat. Nos. is hereby incorporated by reference in its entirety: 5,155,510; 5,386,255; 5,450,146; 5,451,942; 5,550,603; 5,544,140; 5,600,617; 5,639,585; 5,710,752; and 5,757,465.

DESCRIPTION OF RELATED ART

Optical soundtracks for motion pictures were first demonstrated around the turn of the century, and since the 1930's have been the most common method of presenting sound with motion pictures. In modern systems, the transmission of light through the film is modulated by variations in soundtrack width, where an ideally transparent varying width of soundtrack is situated within an ideally opaque surrounding. This type of soundtrack is known as "variable area".

In the mid 1970's Stereo Variable Area (SVA) tracks became increasingly popular, in which two independently modulated bilateral soundtracks are situated side by side in the same area as the normal monophonic (mono) variable area track.

In 1976, Dolby Laboratories introduced its four-channel stereo-optical version of Dolby Stereo, which employed audio matrix encoding and decoding in order to carry four channels of sound on the two SVA optical tracks. "Dolby" and "Dolby Stereo" are trademarks of Dolby Laboratories Licensing Corporation. Dolby Stereo for SVA optical tracks employs a type of 4:2:4 matrix system that records four source channels of sound (left, right, center and surround) on the two SVA tracks and reproduces four channels. Although the original Dolby Stereo stereo-optical format employed Dolby A-type analog audio noise reduction, in the mid-1980's Dolby Laboratories introduced an improved analog audio processing system, Dolby SR, which is now used in Dolby Stereo optical soundtrack films.

Multichannel motion picture sound was employed commercially at least as early as "Fantasound" in which the four-channel soundtrack for the motion picture Fantasia was carried in respective optical tracks on a separate film synchronized with the picture-carrying film. Subsequently, in the 1950s, various "magnetic stripe" techniques were introduced in which multiple channels of sound were recorded in separate tracks on magnetizable materials affixed to the picture-carrying film. Typically, magnetic striped 35 mm film carried three or four separate soundtracks while magnetic striped 70 mm film carried six separate soundtracks. Magnetic striped 35 mm films became obsolete after the introduction of the Dolby Stereo 35 mm optical format.

In spite of these advances in analog soundtrack fidelity, film soundtracks had long been considered a candidate for digital coding due to the high cost of 70 mm magnetic soundtrack films and the perceived limitations of the matrix technology employed in 35 mm optical soundtrack films. In 1992, Dolby Laboratories introduced its Dolby Digital optical soundtrack format for 35 mm motion picture film. Dolby Digital is a trademark of Dolby Laboratories Licensing Corporation. 5.1 channel (left, center, right, left surround, right surround and low frequency effect or LFE) soundtrack information is digitally encoded employing Dolby Laboratories' AC-3 perceptual encoding scheme. That encoded information is in turn encoded as blocks of symbols optically printed between the film's sprocket holes along one side of the film. The analog SVA tracks are retained for compatibility and as a backup. Details of the Dolby Digital 35 mm film format are set forth in U.S. Pat. Nos. 5,544,140, 5,710,752 and 5,757,465. The basic elements of the Dolby AC-3 perceptual coding scheme are set forth in U.S. Pat. No. 5,583,962. Details of a practical implementation of Dolby AC-3 are set forth in Document A/52 of the United States Television Systems Committee (ATSC), "Digital Audio Compression Standard (AC-3)," Dec. 20, 1995 (available on the world wide web of the Internet at <www.atsc.org>). The Dolby Digital system typically provides the channel discreteness of 70 mm magnetic soundtrack films while preserving the low cost and compatibility of 35 mm optical soundtrack films.

Subsequently, in 1993, Sony introduced its Sony Dynamic Digital Sound (SDDS) format for 35 mm motion picture film. In the SDDS system "7.1" channel (sometimes referred to as eight channel) (left, left center, center, right center, right, left surround, right surround and LFE) soundtrack information is digitally encoded using a form of Sony's ATRAC perceptual coding. That encoded information is in turn encoded as strips of symbols optically printed between each edge of the film and the nearest sprocket holes. Sony, Sony Dynamic Digital Sound, SDDS, and ATRAC are trademarks. Some details of the Sony SDDS system are set forth in U.S. Pat. Nos. 5,550,603; 5,600,617; and 5,639,585.

Also in 1993, Digital Theater Systems Corporation ("DTS") introduced a separate-medium digital soundtrack system in which the 35 mm motion picture film carries a time code track for the purpose of synchronizing the picture with a CD-ROM encoded using a type of perceptual coding with 5.1 channel soundtrack information (left, center, right, left surround, right surround and LFE). DTS is a trademark. Some details of the DTS system are set forth in U.S. Pat. Nos. 5,155,510; 5,386,255; 5,450,146; and 5,451,942.

Unlike the DTS system, in both the Dolby Digital and Sony SDDS systems, the respective optically recorded two-dimensional array of symbols represent digital information and the digital information, in turn, represents discrete motion picture soundtrack channels.

Further details of the Dolby Digital, Sony SDDS and DTS systems are set forth in "Digital Sound in the Cinema" by Larry Blake, Mix, October 1995, pp. 116, 117, 119, 121, and 122. As Blake indicates, it is common for 35 mm motion picture films to include the Dolby Digital and Sony SDDS two-dimensional digital optical soundtracks, the DTS one-dimensional optical time code track, and the conventional analog optical SVA soundtrack all on the same film so that the film may be reproduced using any one of the four systems. At page 117 Blake illustrates a 35 mm film having all four systems. FIG. 5 of said U.S. Pat. No. 5,639,585 also shows a 35 mm motion picture film having all four systems.

The high cost of 70 mm magnetic soundtrack films combined with the widespread use of digital soundtracks for 35 mm films has resulted in the release of relatively few 70 mm films in recent years. There is, however, a lingering desire in the motion picture industry for the better picture quality provided by large-format motion picture film, such as 70 mm film, provided that the magnetic soundtrack is replaced by a digital soundtrack. For convenience, all large-format motion picture films, including the 70 mm format and variations thereof, are referred to hereafter as "70 mm."

It is known to employ a variation of the DTS 35 mm system on 70 mm film. The 70 mm motion picture film carries a time code track for the purpose of synchronizing the picture with a CD-ROM in the manner of the DTS' 35 mm system described above.

Notwithstanding the DTS 70 mm system, the widespread use of the Dolby Digital and Sony SDDS systems, makes it desirable to provide one or both of the Dolby and Sony systems on 70 mm film in addition to or in place of the DTS time code. Furthermore, in view of the large installed base of 35 mm Dolby and Sony optical readers and signal decoders, it is desirable that the Dolby Digital and Sony SDDS digital signal carrying optical symbols on 70 mm film be recorded in such a way as to permit the existing 35 mm optical readers and signal decoders to recover the soundtracks with little or no modification. In other words, the present 35 mm playback equipment ideally should be usable without modification: the 70 mm digital soundtracks should be compatible.

There are two major problems in achieving compatibility: (1) the dimensions and layout (picture size, sprocket hole size, number of sprocket holes relative to picture frames, soundtrack positions, etc.) of 70 mm film differ from that of 35 mm film, and (2) the projection speed of 70 mm film is 112.5 feet/minute compared to 90 feet/minute for 35 mm film.

As described in ones of the above-cited references and as shown in FIGS. 1–4, the Dolby Digital soundtrack is a two-dimensional array of symbols representing digital information, the symbols being in blocks located between one set of the film's sprocket holes. If the Dolby Digital soundtrack symbols were placed between the sprocket holes on 70 mm film, the underlying data would have to be changed because of the five sprocket holes in the 70 mm format as opposed to four sprocket holes per picture frame in the 35 mm format. The data stream recovered from the 70 mm film would be different from the data stream recovered from the 35 mm film. The different data structure would, in turn, require significant software revision in theatre decoders.

In addition, because of the symbol location between sprocket holes, a location susceptible to wear, there would likely still be a need for a backup track, either magnetic (expensive for each print) or analog photographic (expensive for start-up because 70 mm film has not heretofore provided for an analog optical soundtrack).

Although the Sony SDDS soundtrack symbols are in continuous strips rather than blocks and are not located between sprocket holes, the underlying SDDS data would also have to be changed from that in 35 mm because of the increased projection speed in 70 mm.

Thus, there is a need for digital soundtracks for 70 mm motion picture film that are compatible with existing 35 mm optical readers and signal decoders.

SUMMARY OF THE INVENTION

It is an object of the present invention to provide a photographically recorded digital soundtrack for a large format motion picture film, such as 70 mm film, that is compatible with existing 35 mm optical readers and signal decoders.

It is a further object of the present invention to provide a method for recording a photographic digital soundtrack on a large format motion picture film, such as 70 mm film, that is compatible with existing 35 mm optical readers and signal decoders.

It is another object of the present invention to provide a photographically recorded digital soundtrack for a large format motion picture film, such as 70 mm film, that provides a digital audio stream essentially unaltered from a digital soundtrack for a 35 mm motion picture film.

It is another object of the present invention to provide a method for recording a photographic digital soundtrack on a large format motion picture film, such as 70 mm film, that provides a digital audio stream essentially unaltered from a digital soundtrack for a 35 mm motion picture film.

It is an object of the present invention to provide a large format motion picture film soundtrack in the form of a photographically recorded two-dimensional array of symbols representing digital information which is readable and decodable by apparatus designed for reading and decoding a photographic digital soundtrack applied to 35 mm film.

It is yet a further object of the present invention to provide a method for applying a soundtrack in the form of a two-dimensional array of symbols representing digital information to a large format motion picture film, such as 70 mm film, which is readable and decodable by apparatus designed for reading and decoding a photographic digital soundtrack applied to 35 mm film.

One having an existing way of writing two-dimensional data on 35 mm film and then wanting to put the same (electrical) data on 70 mm film, might consider several options.

1. One could devise a totally different physical organization of the data, probably requiring a different writer and reader.

2. One could retain substantially the same symbol configuration and organization, but scale it up in both dimensions by the same proportion (5:4 going from 35 to 70 mm), so retaining the same ratio of height to width for each symbol. For optimum readability, square symbols are employed. This approach assumes of course that there is space enough for the larger symbols. This approach is analogous to using different film sizes in still cameras. If data were organized in blocks, and each block were recorded instantaneously (i.e. independent of the film speed), this would theoretically allow the use of the same writer using different magnification in the optics. For continuous two-dimensional data such as in the Sony SDDS system, if it were written continuously using the film motion to provide length-wise "scanning", the same writer could be used in conjunction with optics which magnified across the film but not lengthwise. The reader too would need to be different or at least to employ different optics.

3. One could retain a similar organization and structure but stretch the symbols in one direction only by the necessary proportion. Clearly the symbols no longer have the same optimum ratio of height to width, but the smaller dimension is the same on 70 as 35 mm, so if that smaller dimension can be read reliably from 35 mm, it can be read at least as reliably from 70 mm. Since the track width is unchanged, the same writer and reader can be used, and in fact the feed to the writer and the output of the reader are indistinguishable from those of 35 mm. Note that this is not the same as changing from 7.5 to 15 inches per second on a fixed track width on magnetic tape, since in that case the overall transfer function is changed and hence the feed to the recording head and the output from the playback head are different. This option three is the basis of the present invention.

In accordance with one aspect of the present invention, the normal format of a motion picture soundtrack in the form of a two-dimensional array of photographically recorded symbols representing digital information intended for application to 35 mm motion picture film is modified by stretching the symbols in the direction in which the motion picture film is transported when played, the degree of stretching being commensurate with the increase in film speed of the large-format motion picture film with respect to said 35 mm motion picture film. The stretched format soundtrack is applied to the large-format motion picture film, whereby when said large-format motion picture film is played the information recovered is essentially the same as the information recovered from 35 mm motion picture film to which the normal format of said motion picture soundtrack is applied. Another aspect of the invention is a stretched motion picture soundtrack on a large-format motion picture film, such as would be produced by the method just recited.

Thus, aspects of the invention include (1) a method of producing stretched digital motion picture soundtracks; and (2) a medium, such as motion picture film, having a stretched digital soundtrack.

These and other objects, advantages and features of the invention will become apparent to those skilled in the art upon consideration of the present specification, drawings and claims.

DESCRIPTION OF THE PREFERRED EMBODIMENTS

Figure 1:
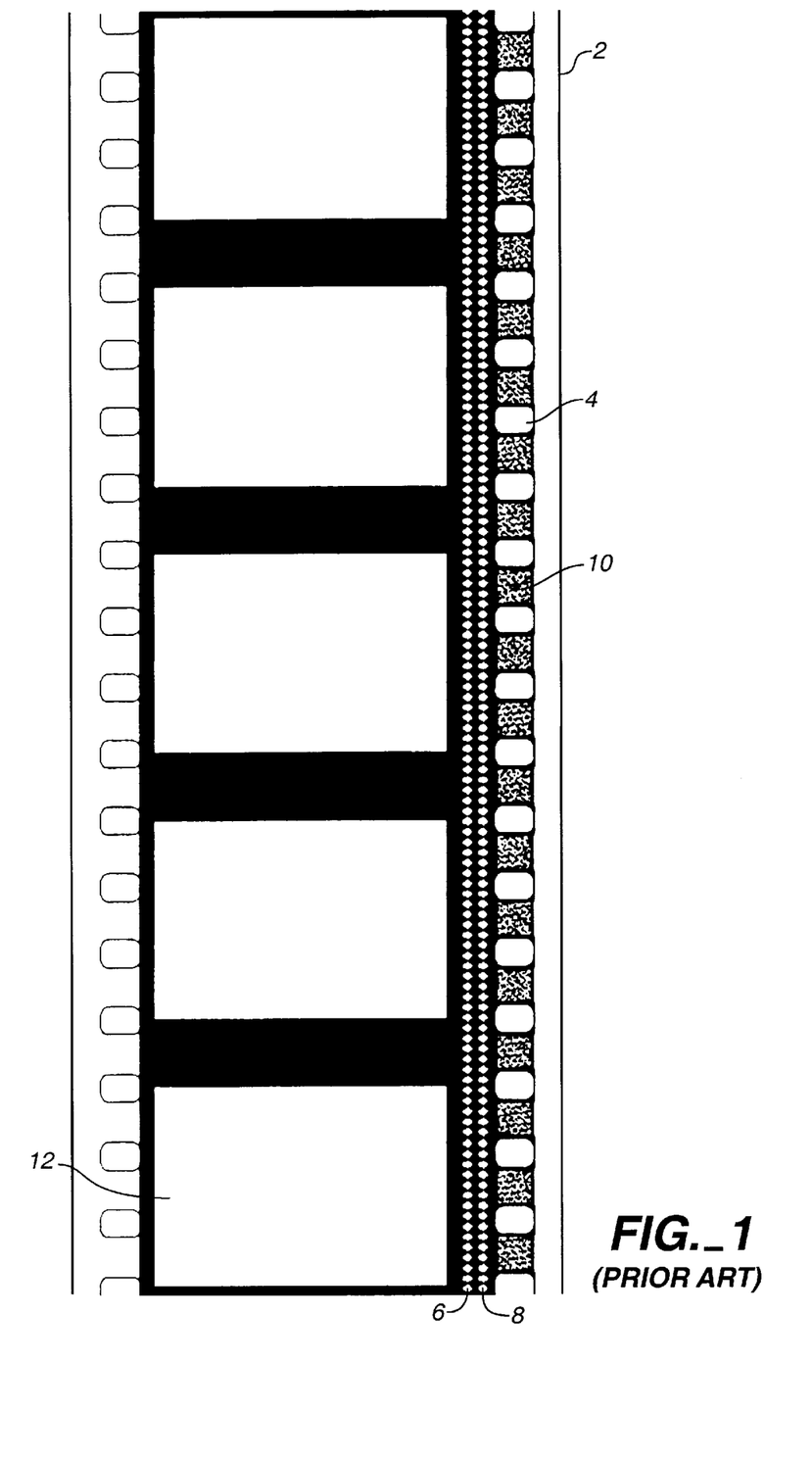
FIG. 1 is a view of a recorded 35 mm motion picture (cinematographic) film carrying both conventional optical analog soundtracks and blocks of optical symbols carrying digital information according to the present invention.

Referring now to FIG. 1 of the drawings, a storage medium carrying optical symbols representing digital information is shown in the form of a 35 mm motion picture (cinematographic) film 2.

Figure 2:
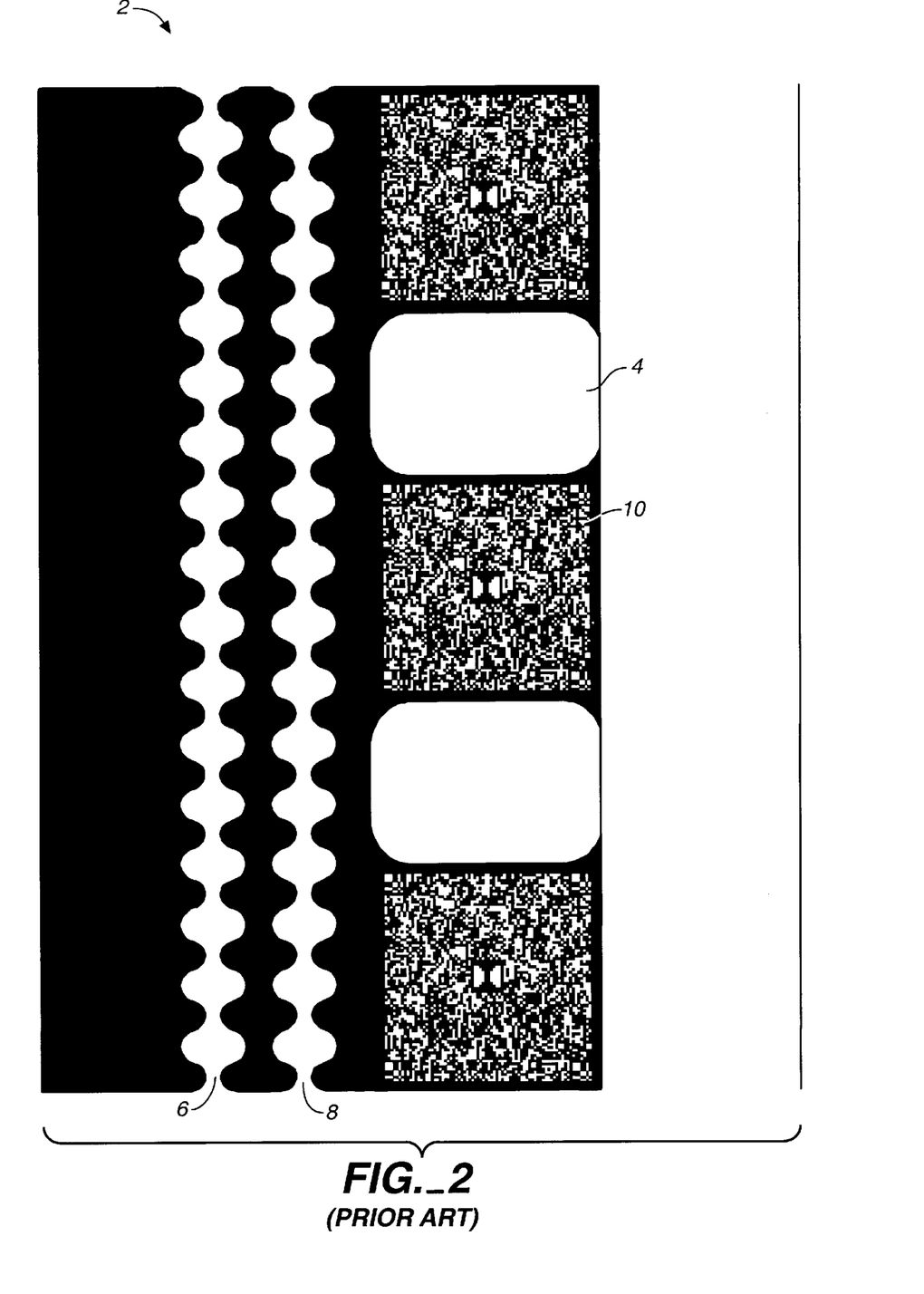
FIG. 2 is an expanded view of a portion of FIG. 1 in the region of the film sprocket holes and the analog soundtracks.
Figure 3:
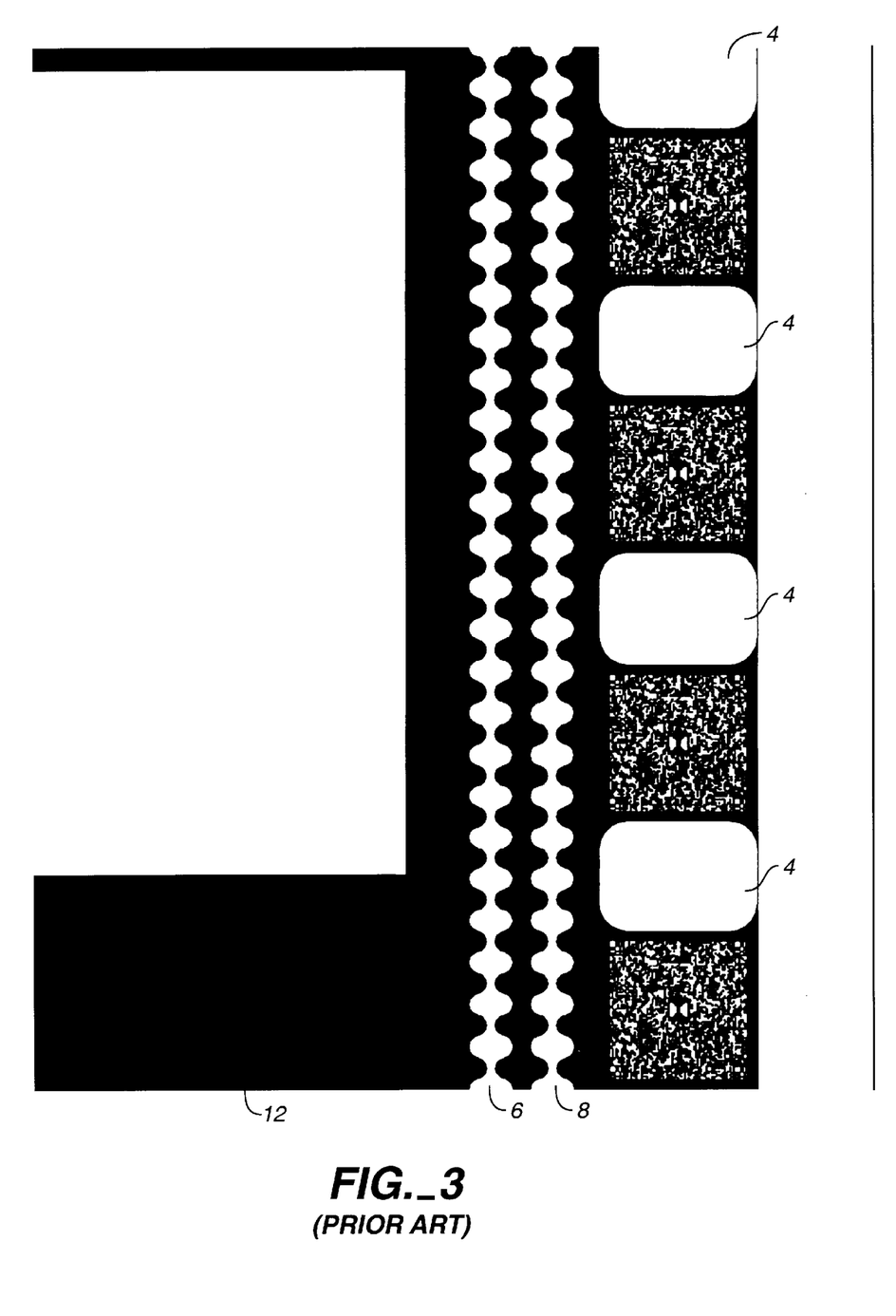
FIG. 3 is a view similar to that of FIG. 2.

FIGS. 2 and 3 show in more detail a portion of the film 2 including sprocket holes 4, two analog SVA or dual-bilateral monophonic tracks 6 and 8, and blocks of optical symbols 10, comprising the two-dimensional array of symbols of the Dolby Digital soundtrack. FIG. 3 also shows a portion of picture area 12.

Figure 4:
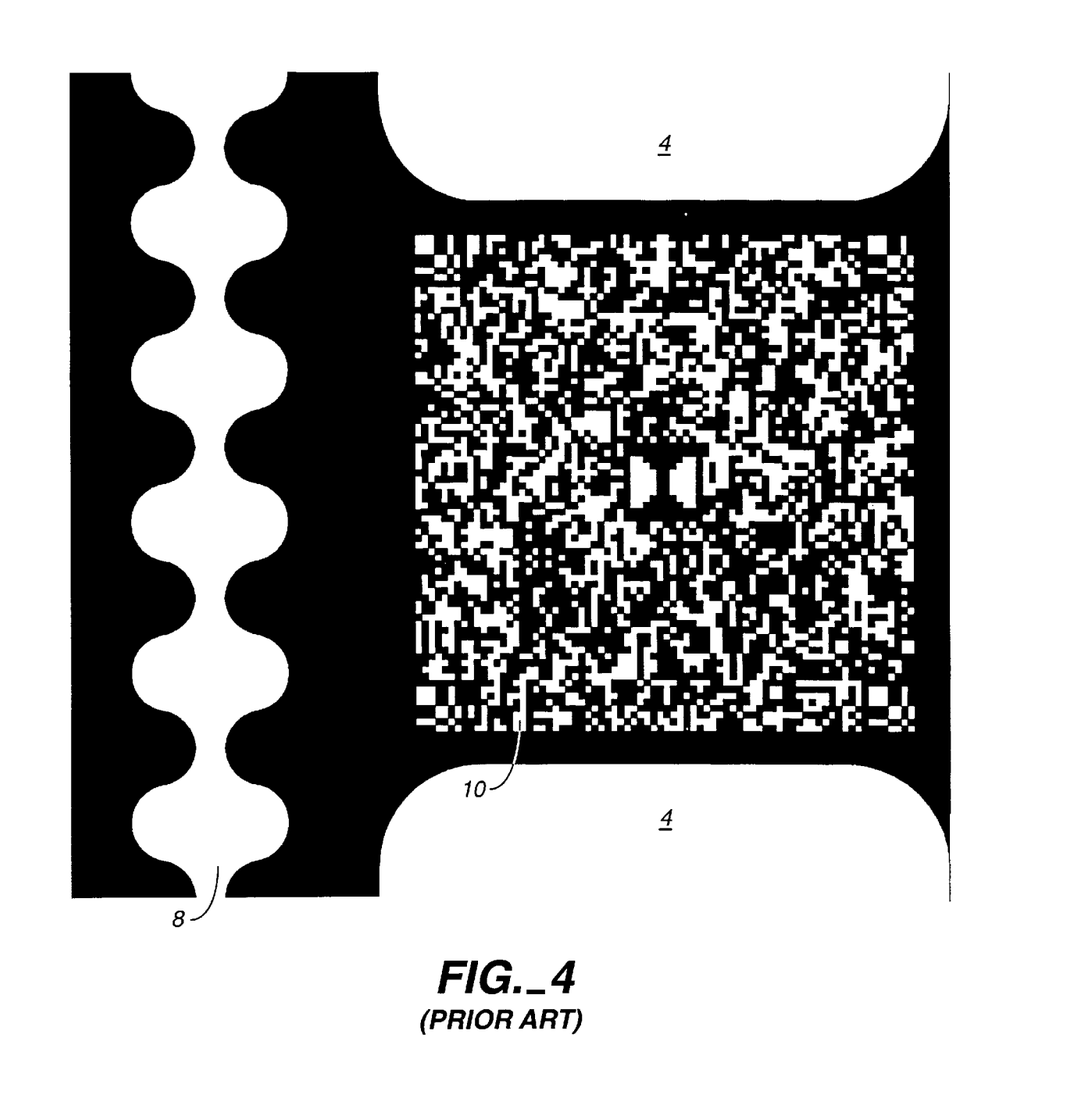
FIG. 4 is a further expanded view of a portion of FIG. 3, showing an exemplary block of optical symbols representing digital information according to the present invention.

FIG. 4 shows in even greater detail a portion of the film 2 including a block of symbols 10 between two sprocket hole perforations 4. One of the analog tracks 8 is also shown.

FIGS. 1 through 4 are prior art (see said U.S. Pat. Nos. 5,544,140 and 5,710,752).

The blocks of symbols comprise a 76-by-76 array of contiguous square optically-transmissive and opaque symbols located relative to one another in such a manner that the symbol centers define the intersections of an orthogonal grid having equally spaced lines. Transmissive symbols may represent one binary value and opaque symbols represent the opposite binary value.

For 35 mm motion picture film, the length of each square symbol side is about 32 microns; therefore the size of a 76-by-76 array of symbols (a block of symbols) is about 96 mils (2438.4 microns). Each block of symbols in an "interperf" (between sprocket hole perforations) area is located equidistantly from the two closest sprocket hole perforations and is horizontally centered and aligned with respect to them. The standard horizontal width of a 35 mm motion picture film sprocket hole is 110 mils; thus, the width of the interperf area transverse to the film length is 110 mils. Two 7-mil (177.8 micron) wide opaque guard bands occupy the areas between each 96-mil wide block of symbols and the left and right boundaries of the interperf area. The standard vertical distance between 35 mm motion picture film sprocket holes is 109 mils; thus, the height of the interperf area along the film length is 109 mils. Two 6.5-mil (165.1 micron) wide opaque guard bands occupy the areas between each 96-mil high block of symbols and the two adjacent sprocket hole perforations.

The placement of the block of symbols representing the Dolby Digital soundtrack information on 35 mm film provides compatibility with motion picture systems which utilize only the older analog soundtracks. As a result, a single inventory film with both analog and digital soundtracks is possible.

In FIGS. 1–4, the central 12-by-12 symbol area of the digital information block depicts a registered trademark of Dolby Laboratories Licensing Corporation, the "Double D" symbol. This is most clearly seen in FIG. 4. Some Dolby Digital soundtracks place data in that central area instead of the Double D symbol.

According to the present invention, when applied to 70 mm film, the digital symbol blocks of the Dolby Digital system are modified with respect to their shape and with respect to their position on the motion picture film.

The shape of the modified symbol blocks is most easily explained by way of a process description. According to the process, the normal symbol blocks and the spaces between them, as would be applied to 35 mm motion picture film, are stretched in the direction of film travel by a factor equal to the ratio of the 70 mm film speed to the 35 mm film speed (namely, by a factor of 1.25 in view of the respective 112.5 ft./min. and 90 ft./min. projected film speeds). Thus, each symbol is stretched in one dimension as is the overall two-dimensional block array of symbols and the space between the blocks in which a sprocket hole would be located on 35 mm film. Thus, each modified block of symbols, and spaces therebetween, is oblong rather than square.

On 70 mm film, the sprocket hole dimensions and spacings are identical to that of 35 mm film. However, there are five sprocket holes per picture frame on 70 mm film instead of four on 35 mm film. Consequently, the stretched blocks and spaces therebetween do not match the 70 mm film's sprocket holes—the blocks no longer fits between the sprocket holes and the spaces between the blocks are greater than the sprocket hole height. Thus, the location of the stretched Dolby Digital soundtrack cannot be between sprocket holes; another location on the 70 mm film must be used.

Figure 5:
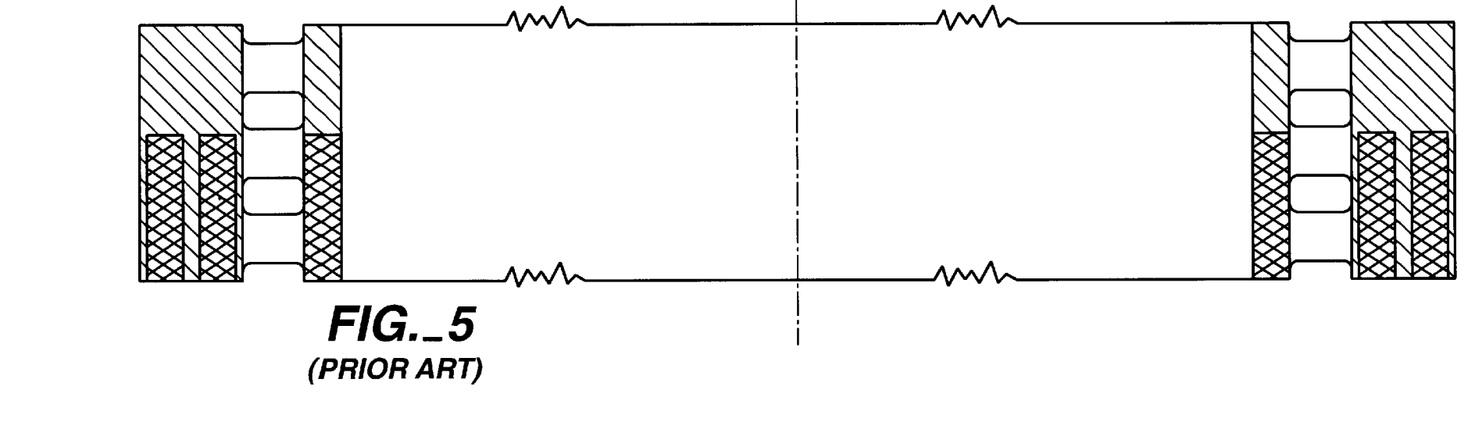
FIG. 5 is a view showing the placement of the six magnetic tracks on a conventional 70 mm release print.

FIG. 5 shows the placement of the six magnetic tracks on a conventional 70 mm release print. The direction of film travel is down, the magnetic coating is up, and the emulsion is down. The left hand magnetic stripe area contains magnetic tracks 1 and 2. The next magnetic stripe contains track 3, followed by track 4 in the first magnetic stripe area to the right. The right hand magnetic stripe area contains magnetic tracks 5 and 6. By omitting the magnetic tracks, the cost of the release print is greatly reduced and the four positions on which the magnetic coating was applied are made available for placement of the stretched Dolby Digital blocks. The magnetic stripes for magnetic tracks 1 and 2 and for tracks 5 and 6 (the stripes between each film edge and the respective sprocket holes) are each 200 mils wide. Either has sufficient width for the 96 mil wide stretched Dolby Digital block. Each stretched Dolby Digital remains 96 mils wide, but is stretched to 120 mils in height. Thus, the stretched Dolby Digital blocks may be located in the former locations of magnetic tracks 1 and 2 or, alternatively, tracks 5 and 6. If there is sufficient room without going into the picture area, the Dolby Digital soundtrack may also be located in the magnetic track 3 or track 4 positions.

Further in accordance with the present invention, the pair of Sony SDDS tracks (located, respectively, between each film edge and the respective sprocket holes) intended for placement on 35 mm film are stretched in the direction of film travel by the a factor equal to the ratio of the 70 mm film speed to the 35 mm film speed (namely, by a factor of 1.25 in view of the respective 112.5 ft./min. and 90 ft./min. projected film speeds). Thus, each symbol is stretched in one dimension as is the overall continuous two-dimensional array of symbols constituting each Sony SDDS digital soundtrack. According to U.S. Pat. No. 5,639,585, the width of each Sony SDDS track is 1.536 mm (about 60.63 mils). The pair of stretched SDDS tracks, having a nominal width of slightly over 60 mils, may be located in the positions of former magnetic tracks 3 and 4 (where the stripe widths were 70 mils). The optical Sony SDDS tracks may be present on the 70 mm film with or without the optical Dolby Digital tracks. In the event that the film does not include the Dolby Digital tracks, the Sony SDDS tracks may be located in the areas formerly occupied by magnetic tracks 1 and 2 or 5 and 6 (one Sony SDDS track in each of the two positions). Alternatively, whether or not a Dolby Digital track is located in one of the two wide former magnetic track areas, both Sony SDDS tracks may be located in one of the two wide former magnetic track areas (the unoccupied one if the other contains the Dolby Digital information).

Figure 6:
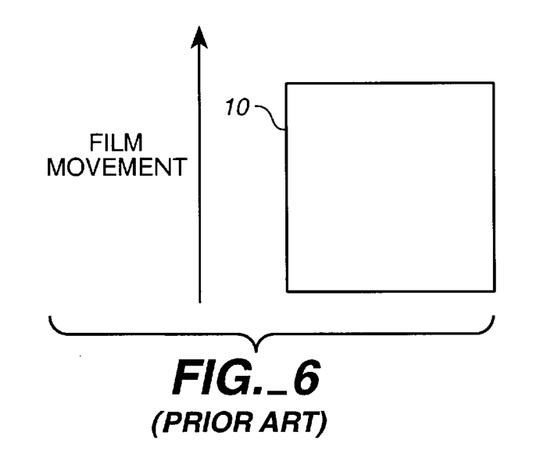
FIG. 6 is a schematic plan view showing a symbol before stretching.

FIG. 6 is a schematic plan view showing a nominally square optical symbol 10 as in the Dolby Digital soundtrack of FIGS. 1, 2, 3 or 4 before stretching. Each Sony SDDS symbol is similar in shape.

Figure 7:
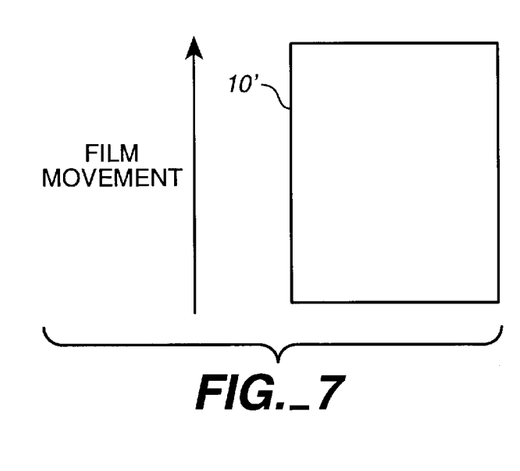
FIG. 7 is a schematic plan view showing a symbol after stretching in the case of stretching by a factor of 1.25.

FIG. 7 is a schematic plan view showing a FIG. 6 symbol 10' after stretching in the case of stretching by a factor of 1.25. The symbol becomes oblong, with a longer dimension in the direction of film movement.

When the 70 mm film is played back at its nominal speed of 112.5 ft./min., the stretched Dolby Digital and Sony SDDS symbols will appear to an unmodified Dolby Digital or Sony SDDS reader as indistinguishable from conventional Dolby Digital and Sony SDDS symbols read from 35 mm film. The same readers may be used without any modification to their optics or otherwise. Consequently, the data stream produced by such readers is identical to that produced in the 35 mm film environment and no changes in electronics or software is required to decode the underlying soundtracks. Of course, the reader must be located in a position appropriate to read the respective Dolby Digital or Sony SDDS information.

Modified compatible Dolby Digital soundtracks for 70 mm may be produced in at least two ways. In order to produce a suitable negative, a 35 mm positive is made with totally conventional digital blocks (as though a normal 35 mm soundtrack were being prepared). This positive step is required in order to provide the block and the sprocket hole images needed for timing purposes. The 35 mm positive can then be optically stretched (such as by use of an anamorphic optics) onto a 35 mm negative, which in turn can be contact printed to 70 mm film. Alternatively, the 35 mm image can be stored in a computer memory and then used to laser scan a stretched image onto a 70 mm negative, along with picture. Techniques for printing symbols on a motion picture film to produce an optically recorded digital soundtrack are well known in the art.

Although described particularly in connection with 70 mm motion picture film, the invention is applicable to other large picture format films. Locations of the one or more modified digital soundtracks may be different in such other film formats.

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

In the claims:

1. A method of applying a motion picture soundtrack in the form of a two-dimensional array of symbols representing digital information to a large-format motion picture film having an increased film speed relative to 35 mm motion picture film, comprising modifying a conventional motion picture soundtrack in the form of a two-dimensional array of symbols representing digital information intended for application to 35 mm motion picture film by magnifying the symbols in one direction, the direction of the array that would be, when applied to motion picture film, parallel to the direction in which the motion picture film is transported when played, the symbols remaining unchanged in the perpendicular direction, wherein the degree of magnification in said one dimension is substantially equal to the ratio of the film speed of said large-format motion picture film to the film speed of 35 mm motion picture film, and printing said modified soundtrack on said large-format motion picture film such that the direction of the array in which the symbols are magnified is parallel to the direction in which the film is transported when played, whereby when said large-format motion picture film is played the information recovered from said modified soundtrack is essentially the same as the information recovered from 35 mm motion picture film to which said conventional motion picture soundtrack is applied.

2. The method of claim 1 wherein said conventional soundtrack is of the type in which the two-dimensional array of symbols are arranged in blocks between sprocket holes on one side of the film, the modified soundtrack comprising images of said blocks and sprocket holes magnified in the direction parallel to the direction in which the motion picture film is transported when played, the modified soundtrack located away from the sprocket holes on said large format motion picture film.

3. The method of claim 1 wherein said conventional soundtrack is of the type in which the two-dimensional array of symbols are in one or more continuous strips, the modified soundtrack comprising each of said one or more continuous strips magnified in the direction parallel to the direction in which the motion picture is transported when played.

4. The method of claims 2 or 3 wherein said large format motion picture film is 70 mm film and the degree of magnification in said one direction is substantially 1.25.

5. The method of claim 1 wherein said modified soundtrack is printed on a location of the large-format motion picture film different with respect to the sprocket holes than the location of the conventional soundtrack on said 35 mm motion picture film.

\* \* \* \* \*